July 30, 1963     W. MESSERSCHMITT ETAL     3,099,420
WING-TIP MOUNTED, PIVOTABLE JET POWER UNITS ON AN AIRCRAFT
Filed March 17, 1961                                  2 Sheets-Sheet 1
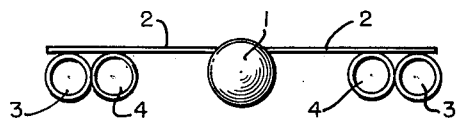
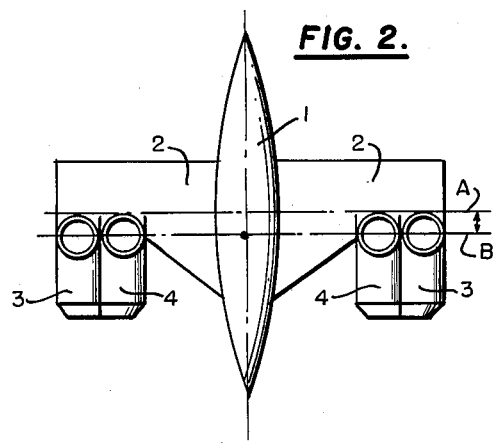
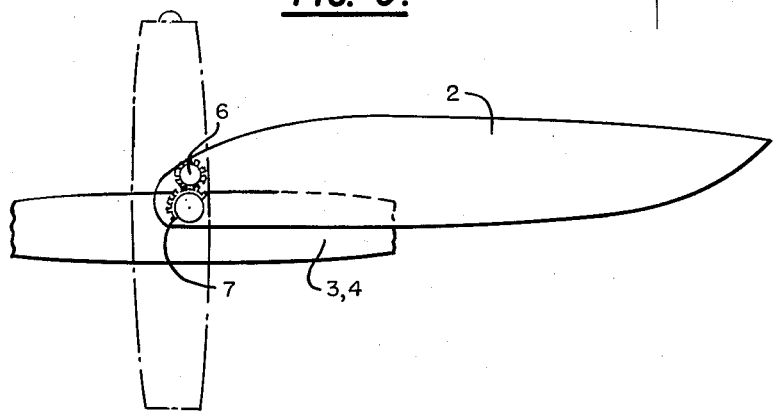
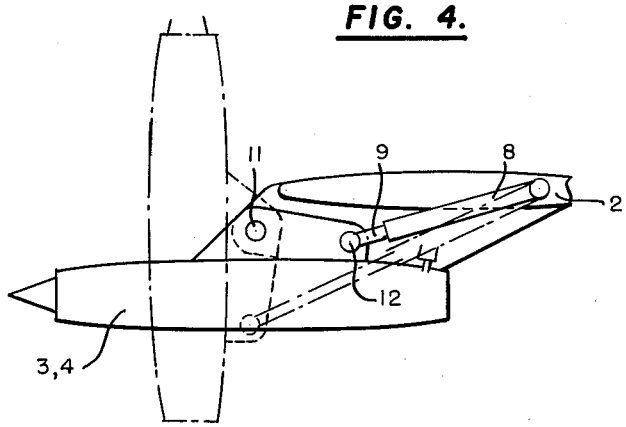
INVENTORS
Willy Messerschmitt
Gero Madelung
BY    Moore, Hall & Pollock
ATTORNEYS July 30, 1963  W. MESSERSCHMITT ETAL  3,099,420

WING-TIP MOUNTED, PIVOTABLE JET POWER UNITS ON AN AIRCRAFT

Filed March 17, 1961  2 Sheets-Sheet 2

INVENTORS
Willy Messerschmitt
Gero Madelung

BY

ATTORNEYS

United States Patent Office 3,099,420
Patented July 30, 1963

3,099,420
WING-TIP MOUNTED, PIVOTABLE JET POWER UNITS ON AN AIRCRAFT
Willy Messerschmitt and Gero Madelung, Munich, Germany, assignors to Messerschmitt A.G., Augsburg, Germany, a company of Germany
Filed Mar. 17, 1961, Ser. No. 96,506
4 Claims. (Cl. 244—12)

This invention relates to the mounting of jet power units on an aircraft, the said units being rotatable through approximately 90° for vertical take-off.

It is known to mount rotatably jet power units on the ends of the wings, or tail unit of an aircraft. When two power units are provided on each wing it is known to dispose them one above the other.

The object of the present invention is to provide an improved mounting for said power units, and to this end the power units are mounted side by side.

The advantages of this arrangement are as follows:

(a) The wing may extend above (or below) the power units, so that the mounting of the power units and the rotation, which may be effected by hydraulic cylinders or the like, becomes simpler, easier and more dependable.

(b) The arrangement enables the axis of rotation to be shifted farther forward, so that the wings can be swept back more, which is important for high speeds.

(c) The effect of the improved mounting for the power units is that the resultant shearing force is shifted forward by about half the diameter of the power units when the latter are in the vertical position (for take-off), and this again gives the advantage of greater sweepback.

(d) The thickness of the wing can be made independent of the forces arising as a result of the power units.

(e) The air inlet for the power units when in approximately the vertical position, that is to say with lateral injection, becomes simpler than when the power units are mounted one above the other or, in a vertical position, one behind the other.

(f) The power unit surface can be used as a wing surface in the normal position (horizontal) whereby a reduction in induced resistance is effected.

More particularly, the invention will now be described with reference to the accompanying drawings wherein:

FIG. 1 is a front view of an aircraft embodying an engine arrangement of the present invention;

FIG. 2 is a plan view of the aircraft of FIG. 1;

FIG. 3 is a mechanical tilting mechanism for tilting the engines;

FIG. 4 is a hydraulic tilting mechanism for tilting the engines;

Figure 5:
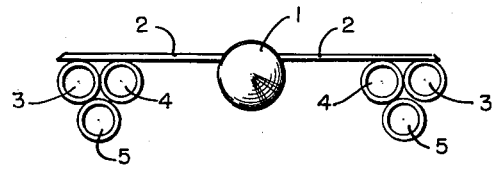
FIGURE 5 shows a cluster of three jet engines respectively.

As shown on the drawings (FIG. 1) the aircraft has a fuselage 1 and wings 2, on which jet propulsion power units are mounted.

In the arrangement according to the present invention, a plurality of jet propulsion power units 3, 4 are arranged side by side as a group and mounted underneath a wing of the aircraft at the tip thereof.

The group of power units 3, 4 are pivotally mounted about an axis of rotation A substantially parallel to the transverse axis B of the aircraft so as to be movable through approximately 90° to a position in which the line of thrust is directed downwards for a vertical take-off (FIG. 2).

The arrangement of the jet power units according to the present invention enables the wings to be swept back more, which is important for high speeds.

Tilting of the engines may be effected by mechanical tilting means such as a pinion and tooth segment arrangement (FIG. 3), where a pinion 6 housed in the wing structure 2 drives a tooth segment 7 on the engines 3, 4.

FIG. 4 shows another possibility of tilting the engines by means of a hydraulic or pneumatic device housed in the wing structure 2, where the engine 3, 4 is pivotally mounted and movable through approximately 90° by means of a hydraulic cylinder 8 having a connecting rod 9 pivoting the engine about a trunnion 11.

The jet power engines may be arranged in staggered position (FIG. 5) as a cluster of respectively three engines, with two of said engines 3, 4 being arranged in side by side relation to one another, and the third engine 5 being arranged in staggered relation to the two other engines.

Figure 6:
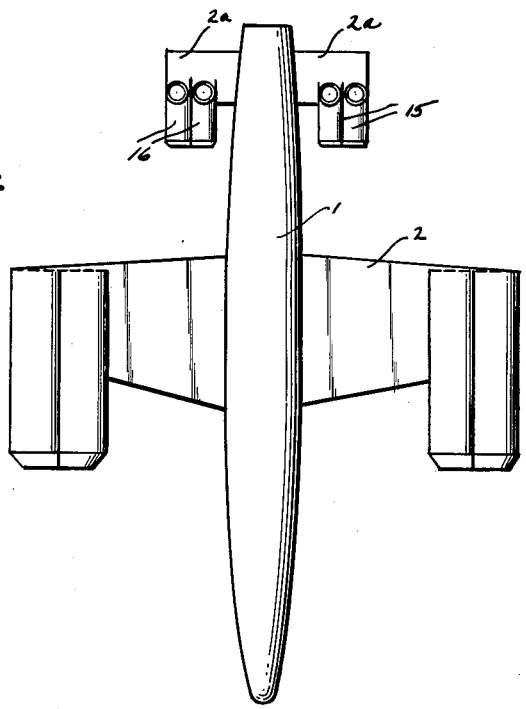
FIGURE 6 shows a tail mounted engine arrangement in accordance with the present invention.

FIGURE 6 illustrates the mounting of pivotable jet power units adjacent the ends of a tail unit of the aircraft. The aircraft may again comprise a fuselage 1 and wing surfaces 2 and 2a, with the wing surfaces 2a comprising a portion of the aircraft tail unit. Engine clusters 15 and 16 (corresponding, for example, to the arrangements shown in FIGURES 2 or 5) may be mounted adjacent the leading edge of surfaces 2a; and they may be moved between substantially vertical and substantially horizontal orientations by arrangements of the type described in reference to FIGURES 3 and 4.

Having thus described our invention, we claim:

1. In a vertical take-off aircraft comprising a fuselage having wings extending therefrom, means for mounting a plurality of jet power units on the wings of said aircraft, each of said jet power units comprising a plurality of jet engines disposed in closely adjacent side by side relation to one another in a unitary cluster beneath a wing tip of said aircraft, said cluster being located at a predetermined position spaced from said fuselage thereby to leave the area of said wing between the root and tip thereof substantially unobstructed, said mounting means including means for pivoting the clustered engines in each of said jet power units, about an axis of rotation substantially parallel to the transverse axis of said aircraft, from a generally horizontal to a generally vertical orientation for purposes of vertical take-off of said aircraft, said mounting means and pivoting means being adapted to pivot said cluster about said axis from a position beneath the tip of said wing to a position located in front of the leading edge of said wing adjacent said wing tip, whereby said cluster effects a downward thrust at a position forward of the leading edge of said wing during said vertical take-off.

2. The structure of claim 1 wherein said plurality of jet power units are disposed adjacent the tail of said aircraft.

3. The structure of claim 1 wherein each of said power units comprises two jet engines respectively disposed inboard and outboard of said axis of rotation.

4. The structure of claim 1 wherein each of said power units comprises a cluster of three jet engines, two of said jet engines being disposed in generally horizontal side by side relation to one another, and the third of said jet engines being mounted in staggered relation to said two engines at a position beneath said two engines.

References Cited in the file of this patent

UNITED STATES PATENTS

| | | |
|---|---|---|
| 3,026,065 | Holland | Mar. 20, 1962 |
| 3,033,490 | Brown | May 8, 1962 |

FOREIGN PATENTS

| | | |
|---|---|---|
| 1,053,322 | Germany | Mar. 19, 1959 |